Jan. 18, 1949.  E. C. HARTLEY  2,459,643
SWIVEL COUPLING
Filed April 21, 1945
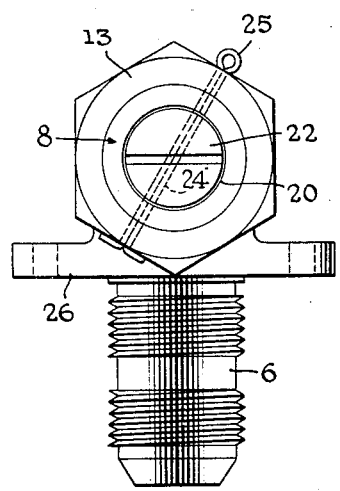
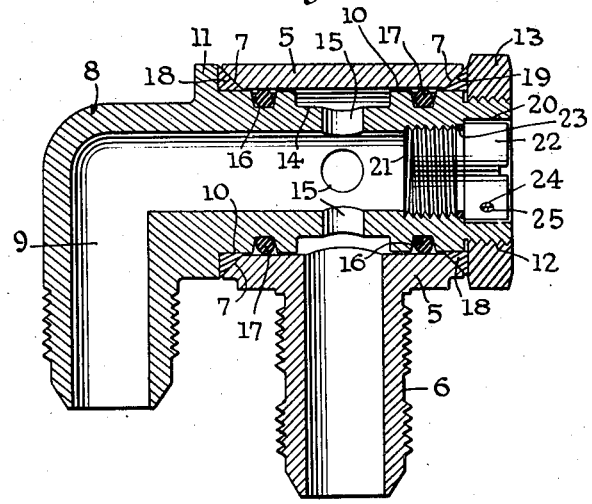
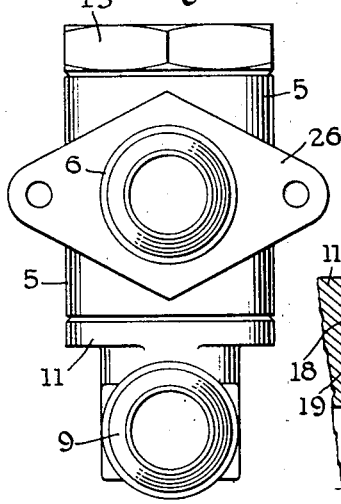
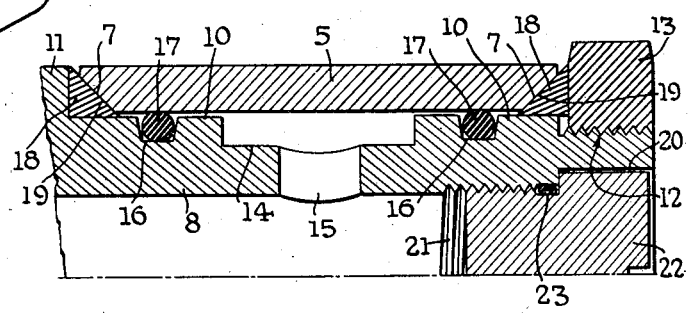
INVENTOR.
Emmett C. Hartley
BY
Mason, Porter & Diller
Attorneys Patented Jan. 18, 1949

2,459,643

UNITED STATES PATENT OFFICE 2,459,643

SWIVEL COUPLING

Emmett C. Hartley, Cleveland, Ohio, assignor to The Parker Appliance Company, Cleveland, Ohio, a corporation of Ohio Application April 21, 1945, Serial No. 589,499

8 Claims. (Cl. 285—96.3)

The invention relates to new and useful improvements in swivel couplings for connecting tubes or conduits in a manner for permitting one tube or conduit to oscillate or rotate with relation to the connected tube or conduit.

In couplings of the character stated, it is customary to provide a stud having provision for connection with a tube or conduit, and a sleeve rotatably receiving said stud and having provision for connection with another tube or conduit. The stud usually includes end abutment portions limiting movement thereof axially within the sleeve, and in order to prevent end play, lateral play or cocking of the stud within the sleeve it has been necessary to hold close length and diameter tolerances at the opposing relatively movable surfaces of the sleeve and stud. It is also known that when close tolerances are provided and metal to metal rubbing contact occurs in couplings formed in whole or in part of relatively soft metal, objectionable scoring or galling occurs. It is an object of the present invention to provide a coupling structure of the character stated including novel bearings at the ends of the sleeve and engaging the stud in a manner avoiding the necessity of providing close tolerances as aforesaid, and also all possibility of scoring or galling.

In its more detailed nature, the invention resides in providing a coupling of the character stated including a hollow sleeve having a hollow extension adapted for connection with a tube or conduit, a hollow stud rotatably mounted in the sleeve and having a hollow extension adapted for connection with a second tube or conduit, and porting affording constant flow communication between the tubes or conduits regardless of relative positions thereof, said sleeve having inwardly bevelled end portions each engaged by a bevelled bearing ring, and end abutments on the stud engaging the rings and holding them tightly against the bevelled end portions of the sleeve so that the sole rotational contact between sleeve and stud will be at the bevelled end portions of the sleeve.

Another object of the invention is to provide a coupling of the character stated in which the stud is provided with an annular groove inwardly of each bearing ring and having a sealing ring therein engaging in sealing contact with the sleeve, and an annular chamber centered between the grooves connected by porting with the interior of the stud opposite the hollow extension of the sleeve.

With the above and other objects in view that will hereinafter appear, the nature of the invention will be more clearly understood by reference to the following detailed description, the appended claims, and the several views illustrated in the accompanying drawing.

In the drawing:

Figure 1 is a central longitudinal sectional view illustrating a coupling embodying the invention.

Figure 2 is an enlarged fragmentary longitudinal section illustrating one-half of the sleeve and the cooperating portion of the stud.

Figure 3 is a right end elevation of the coupling as illustrated in Figure 1.

Figure 4 is an inverted plan view of the coupling as illustrated in Figure 1.

In the example of embodiment of the invention herein disclosed, there is included a cylindrical sleeve member 5 having a hollow extension 6 adapted for connection with a tube or conduit, said sleeve having its opposite open ends provided with inwardly directed bevelled bearing portions 7. Stated another way, the ends of the sleeve 5 may be said to be outwardly flared rather than inwardly bevelled, as will be apparent by reference to Figures 1 and 2 of the drawing.

A hollow stud 8 is rotatably mounted in the sleeve in the manner illustrated in Figure 1 and includes a hollow extension 9 adapted for connection with a tube or conduit, the rotatable mounting of the stud within the sleeve in the manner illustrated in Figure 1 serving to provide a coupling for two tubes or conduits which will permit relative movement of the tubes or conduits without breaking communication therebetween. In this illustration, the stud extension is in the form of a right angularly disposed elbow, but it is to be understood that the extension may project in other than right angular relation to the rotatably mounted main body portion of the stud and in fact may be co-axial with said main body portion.

The main body portion of the stud includes a cylindrical external surface 10 terminating at one end in a fixed abutment flange 11, and at its other end in an externally threaded portion 12 on which an abutment nut 13 is rotatably mounted. The main body portion 10 of the stud is provided with an annular recess 14 intermediately of the ends thereof, and a plurality of radial ports 15 are formed in the main body of the stud in position for communicating between the interior of the stud and the recess 14 in the manner clearly illustrated in Figures 1 and 2.

Between each end of the cylindrical body portion 10 of the stud and the annular recess 14 the stud is provided with an annular groove 16 wherein is mounted a sealing ring 17 formed of rubber or equivalent yieldable material and circular in cross section. It will be apparent by reference to Figures 1 and 2 that the diameter of the cross section of each ring is greater than the depth of the groove 16 in which it is mounted so that when the stud is mounted in the sleeve 5 the sealing rings 16 will project peripherally from the mounting grooves and engage in sealing contact with the inner surface of the sleeve.

It will be apparent by reference to Figures 1 and 2 that a bearing ring 18 is mounted with a snug sliding fit at each end of the cylindrical body portion 10 of the stud endwise of one of the sealing grooves 16, and each bearing ring has a beveled face 19 for engaging the adjacent bearing face 7 of the sleeve 5. It will be observed that the radial face of one bearing ring rests against the fixed abutment flange 11, and the radial face of the other bearing ring is engaged by the abutment face of the adjustably mounted abutment nut 13. As will be apparent by reference to Figures 1 and 2 the cooperatively engaging bearing surfaces 7 and 19 of the sleeve 5 and the bearing rings 18 respectively comprise the wall surfaces of the relatively rotatable sleeve and stud parts which engage in bearing contact. The contacting bevelled surfaces 7 and 19 provided at the end of the sleeve and the outer surface of the rings 18 respectively constitute the sole bearing support of the stud within the sleeve 5. This relation of the parts with the rings 18 tending to spread the ends of the sleeve 5 as the abtument nut 13 is tightened serves to hold the sleeve centered and away from the stud surrounded by the sleeve, and it is unnecessary to provide close tolerances between the sleeve and stud.

A cylindrical counterbore or socket portion 20 is formed in the end of the main body portion of the stud, and the flow passage in said stud end is internally threaded as at 21 to receive a closure screw 22. A sealing ring 23 may be interposed between the head of the screw 22 and the stud end so as to seal the stud end against leakage of fluid. In the completed coupling a hole 24 is drilled through the nut 13, the stud end and the screw 22, and a cotter pin 25 is inserted through the hole and serves to secure the parts in adjustment.

The sleeve 5 may be provided with a mounting flange 26 through the medium of which the coupling can be rigidly mounted on a suitable support.

It will be apparent by reference to Figure 1 that when the coupling is assembled in the manner illustrated, and connected with tubes or conduits, continuous flow of fluid can be provided through said tubes or conduits regardless of the angular relation to which said tubes or conduits may be adjusted by turning of the stud body 8 within the sleeve 5. The fluid communicates between the sleeve extension 6 and the interior of the stud through the stud ports 15, and because of the central placement of the stud recess 14 and the uniformity of the annular pressure areas provided at the respective ends of the recess, pressure in the recess will be balanced and there will be no tendency to shift the sleeve and stud relative to one another in a manner for increasing the stress on the bearings, and the sealing rings 17 will effectively seal the coupling against leakage between the stud portion 10 and the sleeve 5. While the invention is not limited to any particular material in the bearing rings 18, or to any particular angle of the cooperatively engaged bevelled surfaces on the rings and the ends of the sleeve 6, stainless steel and also Formica have been found advantageous, and a 45° angle of the bevel surfaces is preferred.

It is to be understood that when the stud extension is co-axial with the main body of the stud and not in the form of an elbow as herein disclosed, the stud may be provided with a solid end instead of the removably mounted plug screw 22. As previously stated, the bearing rings 18 have a snug slip fit on the cylindrical body portion 10 of the stud, and in the assembling of the coupling, one said ring is mounted on the stud against the fixed abutment 11, and after mounting the sealing rings 17 in the receiving grooves 16 the stud is inserted into the sleeve 5. The other bearing ring 18 is then mounted on the end of the stud and the abutment nut 13 is applied and threaded home so as to secure the coupling. The nut 13 is tightened until the radial flange 11, the adjacent face of the ring 18, the cooperating bevel faces of the rings 18 and those 7 of the sleeve 5, and the cooperating radial faces of the nut and the adjacent bearing ring 18 are in tight contact, and then the nut is backed off a fraction of a turn so that there is no binding action. With the nut held in this backed off position a hole is drilled through the nut 13, the end of the stud and the plug screw 22 and the cotter pin 25 is inserted to secure the adjustment. If desired, the adjustment of the coupling bearing portions may be effected by inserting a thin feeler gage between the nut and the radial face of the adjacent bearing ring, or between the abutment flange 11 and the radial face of the adjacent ring 18 prior to the initial tightening of the nut 13. The nut, the stud and the plug screw may then be drilled and the cotter pin inserted, and then the thin feeler gage may be removed. This latter procedure results in a uniform adjustment of all assemblies.

With the cooperating bevelled bearing surfaces 7, 19, it is not necessary to hold close diameter tolerances on the stud portion 10 and the inside diameter of the bearing rings 18, and it will be noted that the single longitudinal adjustment of the nut takes up both longitudinal and radial play or looseness of the stud within the sleeve because of the provision of the cooperating bevelled bearing surfaces. In other words, it is not necessary to hold close length and diameter tolerances on the sleeve, nor is it necessary that the length of the stud be too accurately held. In addition, the clearance provided between the external diameter of the stud 10 and the internal diameter of the sleeve 5 prevents metal to metal rubbing of the sleeve on the stud which might result in scoring or galling, especially when the stud and sleeve are made of relatively soft metal such as aluminum alloy.

While one form of the invention has been shown for purposes of illustration, it is to be clearly understood that various changes in the details of construction and arrangement of parts may be made without departing from the spirit and scope of the invention as defined in the appended claims.

I claim:

1. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having outwardly flared end portions, and bevelled bearing surfaces movable with the stud and engaged in the ends of the sleeve with said flared end portions of the sleeve in a manner for constituting the sole bearing support of the stud in said sleeve.

2. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having outwardly flared end portions, rings mounted on the stud and presenting bevelled bearing surfaces engaged in the ends of the sleeve with said flared end portions of the sleeve in a manner for constituting the sole bearing support of the stud in said sleeve, and means for adjusting one said ring endwise of the stud in a manner tending to force both rings into the sleeve and to spread the ends of the sleeve radially with relation to the stud surrounded thereby.

3. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having outwardly flared end portions, two joining rings each having a slip fit on the stud, said rings presenting bevelled bearing surfaces engaged in the ends of the sleeve with the flared bevelled bearing surfaces movable with the stud and engaged with the bevelled end portions of the sleeve in a manner for constituting the main bearing support of the stud in said sleeve, and said stud including a fixed abutment engaging one ring endwise of one end of the sleeve and a longitudinally adjustable abutment engaging the other ring endwise of the other end of the sleeve in a manner tending to force both rings into the sleeve and to spread the ends of the sleeve radially with relation to the stud surrounded thereby.

4. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having inwardly bevelled end portions, bevelled bearing surfaces movable with the stud and engaged with the bevelled end portions of the sleeve in a manner for constituting the main bearing support of the stud in said sleeve, said stud being provided with an annular groove inwardly of each set of engaging bevelled stud bearing surface and sleeve end portion, each said groove having a sealing ring therein engaging in sealing contact between the sleeve and stud, and an annular chamber centered between the grooves and connected by porting with the interior of the stud.

5. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having inwardly bevelled end portions, bevelled bearing surfaces movable with the stud and engaged with the bevelled end portions of the sleeve in a manner for constituting the main bearing support of the stud in said sleeve, said bearing surfaces being formed on two bearing rings each having a slip fit on the stud, and said stud including a fixed abutment engaging one ring endwise of one end of the sleeve and a longitudinally adjustable abutment engaging the other ring endwise of the other end of the sleeve, said stud also including an annular groove inwardly of each set of engaging bevelled stud bearing surface and sleeve end portion, each said groove having a sealing ring therein engaging in sealing contact between the sleeve and stud, and an annular chamber centered between the grooves and connected by porting with the interior of the stud.

6. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having inwardly bevelled end portions, and bevelled bearing surfaces supported on said stud and engaged with the bevelled end portions of the sleeve in a manner for constituting the sole bearing support of the stud in said sleeve.

7. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having inwardly bevelled end portions, and bevelled bearing surfaces supported on said stud and engaged with the bevelled end portions of the sleeve in a manner for providing the sole bearing support against both lateral and longitudinal movement between said stud and said sleeve.

8. A swivel coupling comprising a hollow sleeve having a hollow extension adapted for connection with a tubular conduit, a hollow stud mounted for movement about its axis in said sleeve and having a hollow extension adapted for connection with a tubular conduit and porting affording communication between said extensions regardless of adjusted relative positions thereof, said sleeve having inwardly bevelled end portions, and bevelled bearing surfaces supported on said stud and engaged with the bevelled end portions of the sleeve in a manner for constituting the sole bearing support of the stud in said sleeve, said sleeve being spaced from the stud at said porting to form an annular flow chamber, a packing within said sleeve adjacent each bearing surface and means for spacing said packings from said chamber.

EMMETT C. HARTLEY.

REFERENCES CITED

The following references are of record in the file of this patent:

UNITED STATES PATENTS

| Number | Name | Date |
| --- | --- | --- |
| 1,095,757 | Wentz | May 5, 1914 |
| 1,237,309 | Dewald | Aug. 21, 1917 |
| 1,949,961 | Hansen | Mar. 6, 1934 |
| 2,382,375 | Allen | Aug. 14, 1945 |